US012172585B2

(12) United States Patent
Kuehl et al.

(10) Patent No.: US 12,172,585 B2
(45) Date of Patent: Dec. 24, 2024

(54) MULTIPLE-PART SURFACE COVERING FOR THE CLADDING OF SUPPORT STRUCTURES AND CLADDING PART

(71) Applicant: Bayerische Motoren Werke Aktiengesellschaft, Munich (DE)

(72) Inventors: Martina Kuehl, Mamming (DE); Rena Maria Maier, Schrobenhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 300 days.

(21) Appl. No.: 17/706,698

(22) Filed: Mar. 29, 2022

(65) Prior Publication Data
US 2022/0314905 A1    Oct. 6, 2022

(30) Foreign Application Priority Data
Mar. 30, 2021   (DE) ..................... 10 2021 108 087.8

(51) Int. Cl.
B60R 13/02       (2006.01)
D05B 93/00       (2006.01)

(52) U.S. Cl.
CPC .......... B60R 13/02 (2013.01); B60R 13/0256 (2013.01); B60R 13/0212 (2013.01); B60R 13/0243 (2013.01); B60R 13/025 (2013.01); B60R 13/0262 (2013.01); D05B 93/00 (2013.01)

(58) Field of Classification Search
CPC ............ B60R 13/0256; B60R 13/0212; B60R 13/0243; B60R 13/0262; B60R 2013/0293; B60R 13/02; D05B 93/00
See application file for complete search history.

(56) References Cited

U.S. PATENT DOCUMENTS

| 2,214,447 | A | * | 9/1940 | Bave | B60Q 1/26 362/543 |
| 3,940,812 | A | * | 3/1976 | DiForti | A43B 9/00 D6/606 |
| 7,278,363 | B2 | * | 10/2007 | Wieczorek | B68G 7/105 112/470.27 |
| 7,517,577 | B2 | * | 4/2009 | Pedde | B60N 2/5825 24/302 |

(Continued)

FOREIGN PATENT DOCUMENTS

| DE | 103 92 299 T5 | 2/2005 |
| DE | 10 2010 033 885 A1 | 2/2012 |
| WO | WO 2016/162000 A1 | 10/2016 |

OTHER PUBLICATIONS

German-language Search Report issued in German Application No. 10 2021 108 087.8 dated Dec. 10, 2021 with partial English translation (11 pages).

Primary Examiner — Jason S Morrow
(74) Attorney, Agent, or Firm — Crowell & Moring LLP

(57) ABSTRACT

A multiple-part surface covering for the cladding of support structures includes at least two surface covering parts, respective portion of a first and second surface covering parts, and a cover. The at least two surface covering parts are sewn to one another by way of a connecting seam. The respective portion of a first surface covering part and a respective portion of a second surface covering part form a seam overhang. The cover is sewn to the two surface covering parts by way of the connecting seam and covers the seam overhang. An edge strip core is arranged between the cover and the seam overhang.

8 Claims, 1 Drawing Sheet

(56) References Cited

U.S. PATENT DOCUMENTS

| | | | |
|---|---|---|---|
| 7,690,318 B2 * | 4/2010 | Dooley | B29C 45/14 |
| | | | 112/475.17 |
| 8,579,347 B2 * | 11/2013 | Filipp | B60R 13/02 |
| | | | 29/91.1 |
| 9,703,029 B2 * | 7/2017 | Wenzel | G02B 6/001 |
| 2003/0215601 A1 | 11/2003 | Pedde et al. | |
| 2015/0375654 A1 | 12/2015 | Lemarchand et al. | |
| 2018/0044832 A1 | 2/2018 | Schaller | |

* cited by examiner

MULTIPLE-PART SURFACE COVERING FOR THE CLADDING OF SUPPORT STRUCTURES AND CLADDING PART

CROSS REFERENCE TO RELATED APPLICATION

This application claims priority under 35 U.S.C. § 119 from German Patent Application No. 10 2021 108 087.8, filed Mar. 30, 2021, the entire disclosure of which is herein expressly incorporated by reference.

BACKGROUND

The present disclosure relates to a multiple-part surface covering for the cladding of support structures.

In contemporary vehicle construction, surfaces in the vehicle interior or in the passenger compartment of motor vehicles are provided with decorative elements in order to create an appealing visual impression for the occupants of the vehicle. For the interior trim parts or cladding parts, there is a multiplicity of surface variants (leather, artificial leather, films, textiles, Alcantara, recycled leather) that are applied to a support by way of various laminating methods. At present, for laminated interior trim parts, e.g. a knitted spacer fabric, a foam backing or nonwoven fabric is used as haptic layer. In this context, it has become customary to adhesively bond decorative elements, for example in the form of films with the visual appearance of wood or carbon, to a support structure, such as e.g. a plastic support. In addition, it is also known to mount skins of leather or artificial leather on support structures using laminating methods, e.g. press laminating methods or similar laminating methods, e.g. without a fixed upper tool, in order to create the visual appearance of leather. In the course of this laminating operation, the films or the skins are materially bonded to the underlying support structure using an adhesive. The heat needed to activate the adhesive is introduced into the adhesive joint through the skin, e.g. via a hot press die of the press laminating tool by way of contact heat or by means of IR radiation. This activates the adhesive during the laminating method and connects the film or the skin to the support structure.

In the case of the laminating process for instrument panels, the alignment of the seams (closing seam and thus also decorative seam(s)) is decisive for series production that is reliable in terms of the process, reproducible and visually satisfactory. The correct course and the proper shape of the seam are decisive for the interior to give an impression of quality. In the case of what is known as press laminating, this is achieved by means of a permanently pivoted-in seam blade. In the newly developed "membrane laminating process", however, a seam blade makes the procedure more difficult, since permanent pivoting-in would cause damage to the laminating medium—the gel cloth.

The document WO 2016/162000 A1 describes a pre-fixing method in which a seam stump designed for technical sewing is introduced into a groove formed in the injection-molded support.

SUMMARY

Proceeding from this prior art, the present disclosure sets itself the object of specifying a multiple-part surface covering for the cladding of support structures, which surface covering meets the highest quality demands. It is a particular object of the disclosure to specify a surface covering which can be fixed to a support structure in a simple manner.

To achieve this object, the teaching of the disclosure concerns a multiple-part surface covering for the cladding of support structures. The multiple-part surface covering may comprise at least two surface covering individual parts, which are sewn to one another by way of a connecting seam in such a way that a respective portion of a first surface covering individual part and a respective portion of a second surface covering individual part form a seam overhang. In addition, the surface covering may comprise a cover, which is sewn to the two surface covering individual parts by the connecting seam and in the process covers the seam overhang. An edge strip core and/or an edge strip and/or an edge strip bead may be arranged between the cover and the seam overhang. Providing an edge strip core between the cover and the seam overhang makes it possible to especially securely fix the surface covering in the support structure.

The edge strip core may extend lengthwise along a lengthwise extent of the seam overhang. In other words, the edge strip core is formed with its longitudinal axis parallel to the longitudinal axis of the seam overhang. As a result, the edge strip core runs along the seam overhang and thus along that seam of the surface covering that is visible to an occupant of the vehicle. By fixing the edge strip core in the groove of the support part, it is thus possible to obtain a configuration of the surface covering that appears to be of very high quality.

Furthermore, it is possible for a surface of the first part of the surface covering part and a surface of the second part of the surface covering part to be in touching contact with one another in the region of the seam overhang. The surfaces of the surface covering part are surfaces visible to a viewer or an occupant of a vehicle, with the exception of that part of the surface covering part that is in touching contact with the other surface covering part. This contact means that the surfaces and the surface covering part in this portion of the surface covering are not visible to a viewer. In other words: The surfaces of the surface covering form an outer side of the surface covering, which is generally referred to as "right-hand side". In this respect, the inner side forms a side which is not visible in the installed state of the surface covering and is also referred to as "left-hand side". The outer sides of the individual surface covering parts are thus in contact with one another in the region in which the seam overhang is formed. That is to say "right-hand side on right-hand side". The connecting seam is accordingly created "from the left-hand side".

In the region of the seam overhang, the edge strip core may be arranged at least partially between that portion of the first surface covering part and that portion of the second surface covering part that form the seam overhang. In this embodiment, the portion of the first surface covering part and the portion of the second surface covering part form an angle, preferably an acute angle, resulting in the formation of a free space between the portions, in which free space the edge strip core is arranged at least in certain portions. This affords the advantage of a compact structure, in which the seam overhang has a smaller height but a larger width, and as a result provides especially good interlocking with the groove in the support structure part. This makes it possible to create a good pre-fixation.

The edge strip core may preferably be formed from plastic (synthetic materials), cotton wool rope, etc.

Furthermore, the edge strip core may have a circular cross section with an external diameter in the range of from 1.5 mm to 6.0 mm.

In a variant, the edge strip core may have a hollow form and have a wall thickness in the range of from 0.5 mm to 2.0 mm.

The edge strip core may have an elongation £ of from 0% to 100%.

In a further aspect, the disclosure also relates to a cladding part, in particular an interior component for vehicles, having a support structure and a surface covering as described above. The cladding part is preferably an interior component for the interior space of a vehicle. However, the cladding part may also be used for other means of transport, such as aircraft, ships, trains etc. The use of the cladding part in furniture or similar furnishings is also conceivable.

The disclosure is to be described in more detail below on the basis of the figures. In the figures, in a schematic illustration:

DETAILED DESCRIPTION

Figure 1:
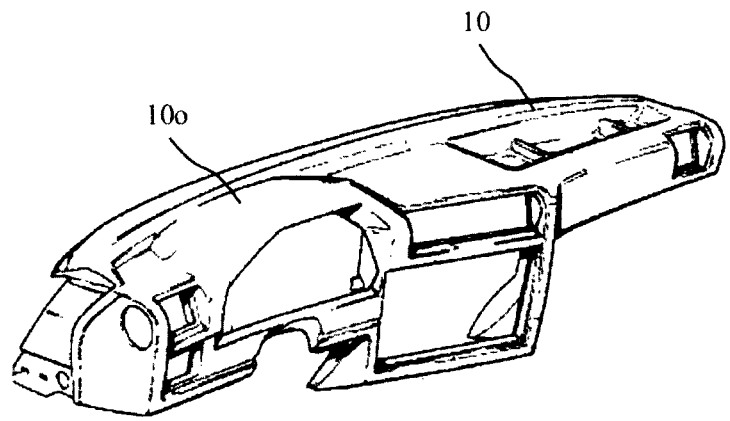
FIG. 1 shows a perspective view of an exemplary support part.

FIG. 1 shows, by way of example, an instrument panel support 10, which is to serve as support structure 10 for the purpose of explaining the disclosure. As an alternative to the instrument panel support illustrated, all of the cladding parts located in the interior, such as glove boxes, central arm rests, central consoles, panels, armrests in the door claddings, door claddings, roof liners, rear consoles, pillar claddings etc. may also serve as support structure 10. This instrument panel support 10 has a surface 10o, which is to be laminated by means of a surface covering 12. As is illustrated in FIG. 1, this surface 10o may concern merely a portion, such as for example the surface in the upper region of the binnacle of what is known as the instrument cluster. The surface 10o to be laminated may, however, also be that part of the surface of the support part 10 that would be visible to an occupant of the vehicle in the interior space of the vehicle. As a further alternative, the surface 10o may also comprise the entire surface of the support part 10, wherein in that case regions of the support part 10 that are not visible to an occupant of the vehicle would also be laminated.

Figure 2:
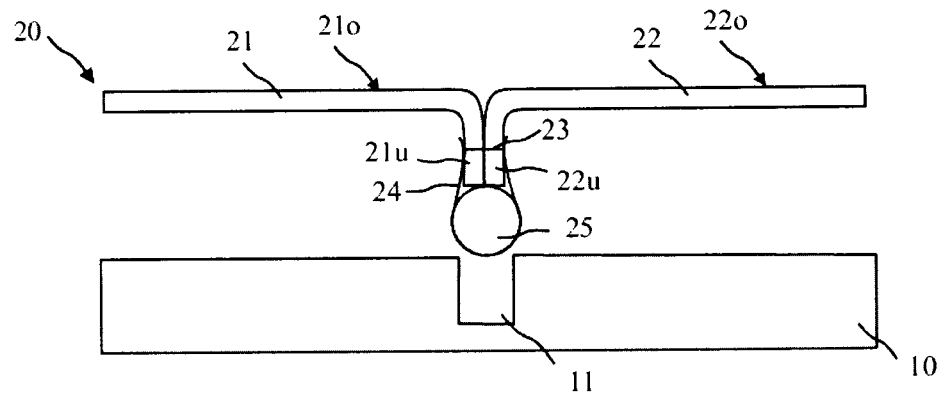
FIG. 2 shows a cross section through a surface covering.

FIG. 2 shows a first embodiment of a multiple-part surface covering 20. The latter comprises two surface covering parts 21 and 22. Those sub-regions of the surface covering parts 21 and 22 that are illustrated horizontally in the figures form a planar cover of the support structure 10 from FIG. 1. The portions 21u and 22u of the surface covering parts are angled away and are illustrated in a perpendicular alignment in the figures. These portions 21u and 22u form a seam overhang. An edge strip core 25 is arranged on the end faces of the portions 21u and 22u forming the seam overhang or on the end face of the seam overhang. A portion of the circumferential surface of the edge strip core 25 is in touching contact with the end face of the seam overhang. A cover 24 is provided to fasten the edge strip core 25 to the seam overhang. The cover loops around the edge strip core 25, the cover coming into touching contact with a portion of the outer circumferential face of the edge strip core 25. The cover 24 may be in the form of a band, for example. The connecting seam 23 comprises a thread or a cord or the like and connects the cover 24 to the surface covering in the region of the parts 21u and 22u. In cross section, the cover has a sack-shaped form in which the edge strip core 25 is arranged. This assembly of seam overhang, edge strip core 25 and cover 24 forms, with a groove 11 located in the support structure 10, a type of tongue and groove connection. By pressing the seam overhang into the groove 11, the edge strip core is elastically deformed and clamped in between the walls of the groove 11. This makes it possible for the surface covering 20 to be pre-fixed on the support structure 10 in a particularly simple manner. In a subsequent step, the surface covering 20 is laminated onto the support structure 10, for example by activating an adhesive located between the surface covering 20 and the support structure 10.

Figure 3:
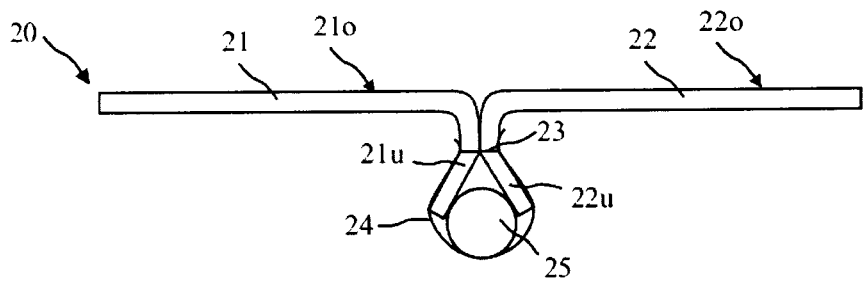
FIG. 3 shows another cross section through a surface covering.

A further alternative embodiment is illustrated in FIG. 3, with reference signs that are the same as those in FIG. 2 referring to identical components. By contrast to the embodiment in FIG. 2, the surfaces of the portions 21u and 22u do not lie against one another fully and are therefore not fully in touching contact in the region of the seam overhang. In the figures, above the seam 23, the surfaces 21o and 22o of the surface covering parts lie against one another and touch one another.

Below the connecting seam 23, the portions 21u and 22u form an acute angle with one another. This produces a free space between the portions 21u and 22u. The edge strip core 25 is arranged such that it penetrates this free space at least in certain portions. In this respect, a portion of the circumferential lateral face of the edge strip core 25 touches the surface 21o in the region of the portion 21u and the surface 22o in the region of the portion 22u. By comparison with the first embodiment, the height of the projecting region with the cover 24 is therefore lower. By contrast to this, however, the width is thicker. This affords the advantage that grooves with a shallower depth in the support structure 10 can be used, the result of which is a smaller overall structure of the interior cladding part as a whole. At the same time, the same advantage of the pre-fixability of the surface covering 20 to an underlying support structure 10 remains.

What is claimed is:

1. A multiple-part surface covering for the cladding of support structures, comprising:
    at least two surface covering parts, which are sewn to one another by way of a connecting seam;
    a respective portion of a first surface covering part and a respective portion of a second surface covering part forming a seam overhang; and
    a cover, which is sewn to the two surface covering parts by way of the connecting seam and covers the seam overhang, wherein
        an edge strip core is arranged between the cover and the seam overhang, and
        in the region of the seam overhang, the edge strip core is arranged at least partially between that portion of the first surface covering part and that portion of the second surface covering part that form the seam overhang.

2. The multiple-part surface covering according to claim 1, wherein the edge strip core extends lengthwise along a lengthwise extent of the seam overhang.

3. The multiple-part surface covering according to claim 2, wherein a surface of the first part of the surface covering part and a surface of the second part of the surface covering part are in touching contact with one another in the region of the seam overhang.

4. The multiple-part surface covering according to claim 2, wherein
the edge strip core is formed from plastic, or synthetic materials, or cotton wool rope.

5. The multiple-part surface covering according to claim 4, wherein
the edge strip core has a circular cross section with an external diameter in the range of from 1.5 mm to 6.0 mm.

6. The multiple-part surface covering according to claim 5, wherein
the edge strip core has a hollow form and has a wall thickness in the range of from 0.5 mm to 2 mm.

7. The multiple-part surface covering according to claim 6, wherein
an elongation $\varepsilon$ of the edge strip core ranges between 0% and 100%.

8. An interior component for vehicles, comprising:
a support structure; and
a surface covering according to claim 7.

* * * * *